July 10, 1945.   G. H. AKLIN   2,380,207
TELEPHOTO OBJECTIVE
Filed Dec. 14, 1943
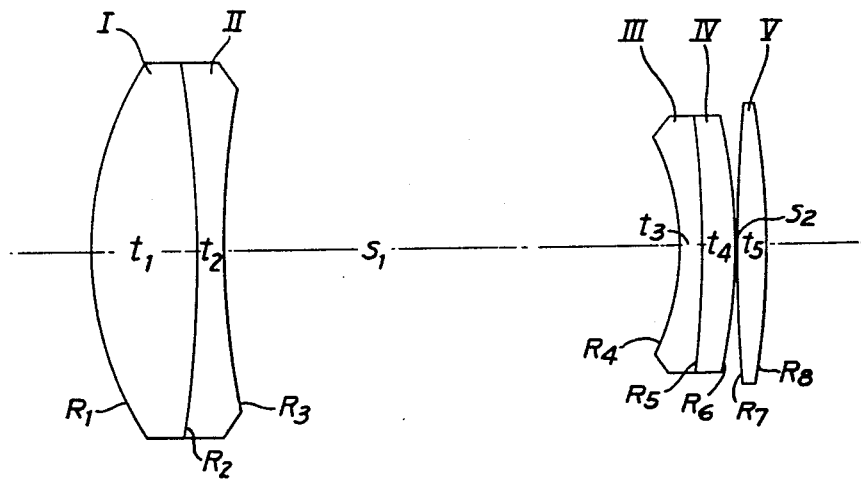
| EF = 100mm. | | | f/5.6 | Ptz.Sum = 0.00 |
|---|---|---|---|---|
| LENS | N | V | RADII | THICKNESSES |
| I | 1.498 | 67.0 | $R_1$ = +16.0 | $t_1$ = 4.8 |
| II | 1.656 | 40.5 | $R_2$ = −51.3 | $t_2$ = 1.3 |
| | | | $R_3$ = +49.3 | $S_1$ = 21.1 |
| III | 1.500 | 61.6 | $R_4$ = −11.0 | $t_3$ = 1.0 |
| IV | 1.755 | 47.2 | $R_5$ = −73.4 | $t_4$ = 1.5 |
| | | | $R_6$ = −30.8 | $S_2$ = 0.05 |
| V | 1.755 | 47.2 | $R_7$ = +508. | $t_5$ = 1.2 |
| | | | $R_8$ = −79.8 | BF = 53.2 |
GEORGE H. AKLIN
INVENTOR
BY
ATT'Y & AG'T Patented July 10, 1945

2,380,207

UNITED STATES PATENT OFFICE 2,380,207

TELEPHOTO OBJECTIVE

George H. Aklin, Rochester, N. Y., assignor to Eastman Kodak Company, Rochester, N. Y., a corporation of New Jersey Application December 14, 1943, Serial No. 514,230

5 Claims. (Cl. 88—57)

This invention relates to telephoto objectives for photographic and like purposes.

The object of the invention is to provide a telephoto lens covering a wide angular field with good illumination at the edges of the field and corrected for distortion, curvature of field, and astigmatism.

Heretofore telephoto objectives have, as a rule, been affected by pincushion distortion. In a few cases this has been corrected, but in each of these cases the great length of the objective reduced the illumination at the edges of the field, or the correction of some of the other aberrations such as astigmatism was sacrificed.

According to the present invention, the distortion, curvature of field, and astigmatism are simultaneously corrected in a telephoto lens which consists of a front positive member and a rear negative member separated by air, the positive member consisting of a biconvex element cemented to the front of a biconcave element whose refractive index is higher and preferably at least 0.11 higher than that of the biconvex element, the negative member consisting of a rear positive component and a front negative component separated by an air space of positive power and thickness less than 0.02f where f is the focal length of the objective, the negative component being meniscus and concave to the front and comprising a negative element cemented to the front of an element whose refractive index is higher by at least 0.11, and the positive component having the more strongly curved of its two bounding surfaces to the rear.

By this arrangement I have succeeded in correcting the distortion in a telephoto objective whose overall length from the vertex of the front surface to the vertex of the rear surface is less than 0.35f. This short overall length is advantageous in obtaining good illumination at the edges of the field.

I find it advantageous in correcting the astigmatism and curvature of field to cement the negative element of the negative component to the front of an element with an index greater than 1.7. It is also advantageous to make the positive component of the rear negative member a simple positive element with an index of refraction greater than 1.7, and of course these two features can be combined. These indices can be as high as glass is available. At present the range for which data has been published goes nearly to 2.1.

The accompanying drawing shows an axial section of a telephoto lens according to the invention and constructional data for one embodiment.

The constructional data is repeated here for convenience:

EF=100 mm. f/5.6 Ptz sum=0.000

| Lens | $N_D$ | V | Radii | Thicknesses |
|---|---|---|---|---|
| I | 1.498 | 67.0 | $R_1=+16.0$ | $t_1=4.8$ |
| II | 1.656 | 40.5 | $R_2=-51.3$ | $t_2=1.3$ |
|   |       |      | $R_3=+49.3$ | $S_1=21.1$ |
| III | 1.500 | 61.6 | $R_4=-11.0$ | $t_3=1.0$ |
| IV | 1.755 | 47.2 | $R_5=-73.4$ | $t_4=1.5$ |
|   |       |      | $R_6=-30.8$ | $S_2=0.05$ |
| V | 1.755 | 47.2 | $R_7=+508.$ | $t_5=1.2$ |
|   |       |      | $R_8=-79.8$ | $BF=53.2$ |

It will be observed that the air space in the rear negative member has an axial thickness less than 0.02f, in fact it is 0.005f, and that it has the shape of a negative lens element which therefore gives it a positive power. The overall length of this objective is 0.31f. Other features of the invention are obvious from the diagram and from the above specifications. As is usual in telephoto objectives, the air space between the front positive member and the rear negative member occupies more than half the overall length of the objective.

The distortion in this objective at 9 degrees from the axis is 0.024% of the focal length, at 12 degrees it is 0.038%, and at 15 degrees 0.013%. This exceptionally good correction of the distortion is obtained by the structure described.

A favorable position for the diaphragm is about 9 units behind the third surface.

What I claim is:

1. A telephoto lens consisting of a front positive member and a rear negative member separated by air, the positive member consisting of a biconvex element cemented to the front of a biconcave element whose refractive index is higher than that of the positive element, and the negative member consisting of a rear positive component and a front negative component separated by an air space of positive power and thickness less than 0.02f where "f" is the focal length of the objective, the negative component being meniscus and concave to the front and comprising a negative element cemented to the front of an element whose refractive index is greater than 1.7 and is higher than that of the negative element by at least 0.11 and the positive component having an index of refraction greater than 1.7 and having the more strongly curved of its two bounding surfaces to the rear.

2. A telephoto objective according to claim 1 in which the overall length from the vertex of the front surface to the vertex of the rear surface is less than 0.35f.

3. An objective according to claim 1 in which the difference between the refractive indices of the two elements of the front positive member is at least 0.11.

4. A telephoto lens according to claim 1 in which the rear positive component is biconvex.

5. An objective substantially according to specifications shown in the following table:

| Lens | N | V | Radii | Thicknesses |
|---|---|---|---|---|
| I | 1.5 | 67 | $R_1=+0.2F$ | $t_1=0.05F$ |
| II | 1.66 | 40 | $R_2=-0.5F$ | $t_2=0.01F$ |
|  |  |  | $R_3=+0.5F$ | $S_1=0.2F$ |
| III | 1.5 | 62 | $R_4=-0.1F$ | $t_3=0.01F$ |
| IV | 1.76 | 47 | $R_5=-0.7F$ | $t_4=0.01F$ |
|  |  |  | $R_6=-0.3F$ | $S_2<0.01F$ |
| V | 1.76 | 47 | $R_7=+5F$ | $t_5=0.01F$ |
|  |  |  | $R_8=-0.8F$ |  | where F is the focal length of the objective, where the first column numbers the elements from front to rear the index N is given for the D line of the spectrum, V is the dispersive index, R, t and S are respectively the radii of curvature, the thicknesses and the spacings numbered from the front and where the + and − signs designate surfaces which are respectively convex and concave toward the front.

GEORGE H. AKLIN.